United States Patent [19]

Jackson

[11] Patent Number: 4,853,538
[45] Date of Patent: Aug. 1, 1989

[54] RADIATION DETECTOR ARRANGEMENTS AND METHODS

[75] Inventor: John Jackson, Lindfield, England

[73] Assignee: U.S. Philips Corp., New York, N.Y.

[21] Appl. No.: 224,108

[22] Filed: Jul. 26, 1988

[30] Foreign Application Priority Data

Jul. 31, 1987 [GB] United Kingdom ................ 8718189

[51] Int. Cl.$^4$ ...................... H01L 27/18; H01L 39/00
[52] U.S. Cl. .............................. 250/336.2; 250/338.4; 250/349; 250/370.15
[58] Field of Search ................ 250/336.2, 352, 370.15, 250/349, 338.4

[56] References Cited

U.S. PATENT DOCUMENTS 2,189,122  2/1940  Andrews .......................... 250/336.2
2,932,743  4/1960  Atwood ............................ 250/336.2

Primary Examiner—Carolyn E. Fields
Attorney, Agent, or Firm—William L. Botjer

[57] ABSTRACT

Infrared, mm-wave or other radiation (100) is detected with at least one detector element in the form of a temperature-sensitive resistor (1) having a high positive temperature coefficient, e.g. 100 micro-ohm·cm·K$^{-1}$. A sufficiently high voltage V is applied across the resistor (1) by means of a circuit (Vb,T1) so that, in accordance with the invention, the resistor (1) passes a sufficient current (I) as to raise its temperature by Joule heating to a position at which a further increase in its temperature in response to incident radiation (100) reduces the Joule heating by reducing the current (I), thereby stabilizing the temperature of the resistor (1). This varying current (I) through the resistor (1) is measured (e.g. as a voltage V' by means of a transconductance amplifier A) to provide a signal indicative of the power of the incident radiation (100). The change in the Joule heating produced by a change in the temperature of the resistor (1) at this position is larger (e.g. more than 10 times larger) than a change in power of the incident radiation (100) required to produce that same change in temperature of the resistor (1) in the absence of any change in Joule heating. As a result of this internal stabilization of its temperature due to the changes in Joule heating, the detector element (1) has a short time constant for response, and thermal cross-talk problems do not arise for an array of the detector elements (1) sharing a common body of the resistance material. The resistance material may be, e.g., a semiconducting barium titanate operated around or above ambient temperature, or an oxygen-deficient mixed oxide of barium, copper and yttrium which is superconducting when cooled below its high positive temperature coefficient. The resistor(s) may be mounted on a semiconductor circuit, possibly on a cryogenic cooler.

11 Claims, 3 Drawing Sheets

RADIATION DETECTOR ARRANGEMENTS AND METHODS

BACKGROUND OF THE INVENTION

This invention relates to radiation detector arrangements comprising at least one detector element in the form of a temperature-sensitive resistor having a high positive temperature coefficient, particularly but not exclusively with arrays of such detector elements which detect infrared radiation and which are mounted on a semiconductor circuit substrate comprising circuitry for processing signals from the resistors. The invention also relates to method of detecting incident radiation using such resistor detector elements.

In Chapter 7 of the book entitled "Optical Radiation Detectors", by E. L. Dereniak and D. G. Crowe and published in 1984 by John Wiley & Sons Inc. (U.S.A.) in the Wiley Series in Pure and Applied Optics, various bolometers are described for the detection of infrared radiation. Five types are identified, the most commonly used being the metal, the thermistor and the semiconductor bolometers. All the bolometer types operate on the principle that a temperature change produced by the absorption of radiation causes a change in electrical resistance of the material used to fabricate the bolometer. This change in resistance is detected in known bolometers as a change in voltage across the bolometer element through which a small bias current is applied.

In the metal type, the bolometer material is typically nickel, bismuth or platinum so that the resistor has a positive temperature coefficient and the voltage increases with increase in temperature. In the thermistor type, the material is typically sintered oxides of manganese, cobalt and nickel and has a negative temperature coefficient so decreasing the voltage across the resistor. In the semiconductor type, a material such as doped monocrystalline germanium is used at cryogenic temperatures where it has a high negative temperature coefficient, so also giving a decrease in voltage with increase in temperature.

At page 152 of said book so-called "superconducting bolometers" are mentioned. The temperature-sensitive resistor of this type has a high positive temperature coefficient at a transition in its electrical conductance, from a superconducting state to a more normal resistive state. This is schematically illustrated in FIG. 7-1 of said book. The electrical resistance changes dramatically (by order of magnitude) over the transition temperature range. However, as mentioned at page 152 of said book, this device has not been used extensively as a detector, because of the stringent temperature control that is required, normally at very low cryogenic temperatures.

Thus, for example, for normal operation of a superconducting tin bolometer the operating temperature (about 3.7 K) of the detector element must be stable to within about $10^{-5}$ K. Stabilization of the operating temperature of a superconducting bolometer is considered in some detail in the article of this title by N. A. Pankratov, G. A. Zaytsev and I. A. Khebtov in the Soviet Journal of Optical Technology Vol. 36 (1969) pages 521 to 524. The detector arrangement comprises circuit means (in the form of a bridge circuit) for applying a voltage across the resistor, and temperature-regulation means (in the form of a base cooled by liquid helium) for regulating the temperature of the resistor so as to operate the resistor in the transition region around a temperature of 3.7 K. In this Pankratov et al article the operating point of the bolometer is represented by a simplified heat balance equation of the following general form:

$$G \cdot (Tb - To) = Wi + Wr \qquad (1)$$

where
- Tb is the temperature of the bolometer element
- To is the temperature of is base (cooled by liquid helium)
- G is the thermal conductance between its cooled base at To and the bolometer element at Tb
- Wi is the power dissipated in the bolometer element by the current passed therethrough, and
- Wr is the power input to the bolometer element from the incident radiation.

As recognised in this Pankratov et al article, the main cause of instability in these known superconducting bolometers is the variation in temperature of its base which affects the factor $G \cdot (Tb - To)$. Furthermore, it is difficult to use these bolometers to detect any significant change in the incident radiation power Wr (for example from a hot object in an ambient temperature scene), because such a change may shift the temperature of the bolometer element above the temperature transition region. It is noted in the Pankratov et al article that any instability of the bias current through the bolometer element (i.e. a change in the factor Wi) can be neglected in practice, i.e. Wi is substantially constant.

In addition to the restricted utility due to stringent temperature regulation, the constructions of known superconducting bolometers are not suitable for integration in arrays (either linear arrays or 2-dimensional arrays), and neither are they suitable for mounting on a semiconductor circuit substrate comprising circuitry for processing signals from the bolometers.

SUMMARY OF THE INVENTION

The present invention involves a novel mode of operation of a positive temperature coefficient resistor as a radiation detector element in which its temperature is raised by applying a sufficient bias voltage across the resistor element to effect Joule heating (i.e. resistance heating) of the element to a position at which a further increase in its temperature in response to the incident radiation reduces the Joule heating (due to a high positive temperature coefficient of electrical resistance) thereby stabilizing the temperature of the resistor. The positive temperature coefficient resistor, its thermal ambient and its electrical circuit can be designed such that the resistor performs the following functions in accordance with the invention: heating itself, sensing its temperature, controlling its temperature, and providing a measure of incident radiation power. Changes in the incident radiation power can be sensed as changes in the current flow through the resistor which are a measure of the changes in the internal power dissipation of the resistor. Thus, in accordance with the present invention, a change in the incident radiation power changes the electrical operating conditions of the detector so that the change in equilibrium operating temperature of the resistor is much less than it would have been if the operating conditions had remained constant as in known bolometers.

According to one aspect of the present invention there is provided a radiation detector arrangement comprising at least one detector element in the form of a temperature-sensitive resistor whose electrical resistance changes in response to radiation incident on the detector element, the resistor having a high positive temperature coefficient of electrical resistance at a transition in its electrical conductance, circuit means for applying a voltage across the resistor during operation of the detector arrangement, and temperature-regulation means for regulating the temperature of the resistor so as to operate the resistor in said transition, the arrangement being characterized in that the temperature-regulation means comprises the resistor and the circuit means which passes sufficient current through the resistor during its operation as to raise the temperature of the resistor by resistance heating to a position in said transition at which a further increase in its temperature in response to incident radiation reduces the resistance heating by reducing the current, thereby stabilizing the temperature of the resistor at said position, the positive temperature coefficient at said position being sufficiently high that the change in the resistance heating produced by a change in the temperature of the resistor at said position is larger than a change in power of the incident radiation required to produce that same change in temperature of the resistor in the absence of any change in resistance heating.

According to another aspect of the present invention there is provided a method of detecting incident radiation using at least one detector element in the form of a temperature-sensitive resistor whose electrical resistance changes in response to radiation incident on the detector element, the resistor having a high positive temperature coefficient of electrical resistance at a transition in its electrical conductance, wherein a voltage is applied across the resistor during operation of the detector arrangement, the method being characterized in that sufficient current is passed through the resistor by the application of the voltage as to raise the temperature of the resistor by resistance heating to a position in said transition at which a further increase in its temperature in response to incident radiation reduces the resistance heating by reducing the current, whereby stabilizing the temperature of the resistor at said position, and in that variations in the current through the resistor are measured to provide a signal indicative of the power of the incident radiation, the positive temperature coefficient of the resistor at said position being sufficiently high that the change in the resistance heating produced by a change in the temperature of the resistor at said position is larger than a change in power of the incident radiation required to produce that same change in temperature of the resistor in the absence of any change in resistance heating.

By thus using changes in the resistance heating of the resistor to provide a significant degree of self-regulation of the temperature of the resistor in accordance with the present invention, the changes in operating temperature of the resistor due to changes in the incident radiation power are less than would have been the case in the absence of any change in resistance heating. As a result of this internal stabilization of the resistor temperature, the detector element can respond quickly to changes in the incident radiation power, so having a short time constant. Furthermore, in the case of an array of these detector elements having a common body of the resistor material, the change in resistance heating in each resistor in response to the incident radiation serves to reduce thermal cross-talk between that respective resistor and neighbouring resistors in the array.

In addition to this self-regulation of its temperature and its suitability for integration in arrays, detector elements in the form of resistors in accordance with the invention may be mounted on semiconductor circuit substrates comprising at least part of the circuitry for processing signals from these detector elements. In order to simplify the signal processing, the circuit preferably maintains a substantially constant bias voltage across the resistor. In this manner thermal equilibrium is achieved by a negative feedback situation in which the resistance heating is inversely proportional to the resistance of the resistor and the current flow is proportional to the internal power dissipation and inversely proportional to the resistance.

The temperature of operation of the resistor is dependent on the type of resistor material used. In one form the high positive temperature coefficient is present at a transition from a superconducting state. Recently new superconducting materials have been devised in which the transition from the superconducting state occurs at moderately high cryogenic temperatures, for example around 90 K. Examples of such materials are described in, for example, Physics Review Letters, Apr. 20, 1987, Vol 58 No. 16 at pages 1676 to 1679 and various papers in the special section on high Tc oxide superconductors in Japanese Journal of Applied Physics Letters, Part 2 Vol. 26 (1987) No. 4. These materials are mostly ceramics comprising mixed oxides of barium, copper, and yttrium, although other elements may be used, such as calcium, and strontium instead of (or in addition to barium, and such as scandium, lanthanum, lutetium, ytterbium, etc instead of (or in addition to) yttrium. These materials which are mostly oxygen-deficient perovskite structures are superconducting at, for example, liquid nitrogen temperature. Many of these new superconducting materials may be used to provide positive temperature coefficient resistors as detector elements in radiation detector arrangements in accordance with the present invention, although it should also be understood that other materials exhibiting a high positive temperature coefficient of electrical resistance at a transition at other temperatures, for example around ambient temperature or at an elevated temperature, may also be used to provide the detector elements in detector arrangements in accordance with the present invention.

Thus, for example, the transition in conductance of semiconductors, doped barium titanate ceramics about the Curie point (normally approximately 120° C. (390 K) may be used, and by the partial or total substitution of the Ba or Ti by other elements, this transition can be set at temperatures as low as about 175 K or as high as about 600 K (about 330° C.). Such semiconducting barium titanate ceramics are described in, for example, an article entitled "Mechanism of Electrical Conductivity in Semiconducting Barium Titanate Ceramics" by G. Mader, H. Meixner and P. Kleinschmidt, published in the Siemens Forschungs-und Entwicklungs-Berichte, Vol. 16 (1987) No. 2 pages 76 to 82.

BRIEF DESCRIPTION OF THE DRAWINGS

These and other features in accordance with the present invention are illustrated in specific embodiments of the invention now to be described, by way of example, with reference to the accompanying diagrammatic drawings, in which.

DETAILED DESCRIPTION OF THE PREFERRED EMBODIMENTS

Figure 1:
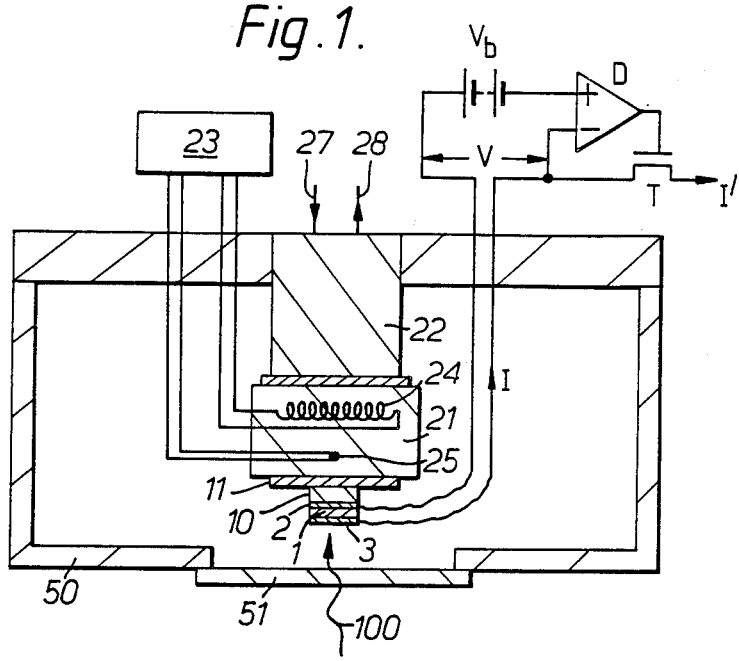
FIG. 1 is a sectional schematic view of a radiation detector forming part of an arrangement in accordance with the invention.
Figure 2:
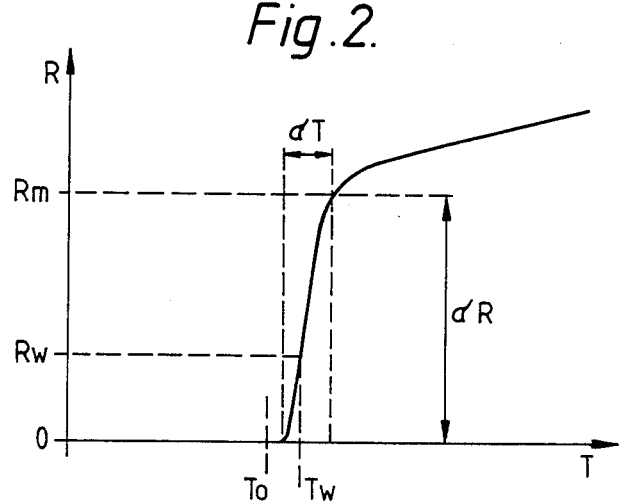
FIG. 2 is a plot illustrating the variation of electrical resistance (R) with temperature (T) for one example of a resistance material in a radiation detector arrangement in accordance with the invention.

FIG. 1 illustrates a radiation detector arrangement comprising a detector element in the form of a temperature-sensitive resistor 1 whose electrical resistance changes in response to radiation 100 incident on the detector element. The resistor comprises a body 1 of resistance material between electrodes 2 and 3. With appropriate choice of the materials and construction of the resistor detector element, the arrangement can be designed to detect electromagnetic radiation in a desired wavelength range, for example infrared radiation of visible light, or microwave radiation in the millimetre wavelength range. The radiation to be detected may be absorbed in the resistance material 1 itself when suitable for that purpose, or it may be absorbed in a coating on the resistance material 1 (for example, as part of the front electrode 3 of the resistor) or in a coating on the front electrode 3 of the resistor. The use of such absorbent materials to convert radiation power into heat which is transmitted to the body of a detector element is already known in the art, and so it will not be further described in the present specification. The resistance material 1 is such that the resistor has a high positive temperature coefficient of electrical resistance R at a transition dR,dT (for example, as in FIG. 2) in its electrical conductance.

The arrangement also comprises circuit means (for example Vb,D,T in FIG. 1) for applying a voltage V across the resistor 1 during operation. Temperature-regulation means (for example elements 21,22,23) are present for regulating the temperature of the resistor 1 so as to operate the resistor in the transition dR,dT. In the particular form illustrated in FIG. 1, by way of example, the resistor 1 is thermally coupled via a thermally-resistive path 11 to a temperature-controlled heat sink (comprising a cooler 22 and a heater block 21) for cooling the resistor 1 to a temperature which is near the bottom of the transition dR,dT in the absence of any resistance heating of the resistor 1. By including a cooler 22, the resistor 1 may be operated below or around ambient temperature.

In accordance with the present invention, in addition to these thermal-mounting elements 11,21,22 in FIG. 1, the temperature-regulation means comprises the resistor 1 itself and the circuit means Vb,D,T which passes sufficient current through the resistor 1 as to raise the temperature T of the resistor 1 by resistance heating to a position (around Tw in FIG. 2) in the transition dR,dT at which a further increase in its temperature T in response to incident radiation 100 reduces the resistance heating by reducing the current, thereby stabilizing the temperature T of the resistor 1 at this position around Tw. The positive temperature coefficient at this position around Tw is sufficiently high that the change in the resistance heating produced by a change in the temperature T of the resistor 1 around Tw is larger (preferably at least 10 or more times larger) than a change in power of the incident radiation 100 required to produce that same change in temperature T of the resistor 1 in the absence of any change in resistance heating. Thus, the temperature T of the resistance material 1 can be auto-stabilised at a virtually constant temperature Tw as a result of the rapid reduction in resistance heating as the temperature T tries to rise further. Since there is no time delay between the heating and sensing mechanisms, a very high coefficient of resistance can lead to a very stable temperature Tw.

This auto-stabilization property is used in accordance with the present invention to set the normal operating point Tw of the resistor 1 and to give an output current which is a measure of the instantaneous power of incident radiation 100. The operating point is determined by the thermal balance, represented in simplified form by the following equation:

$$Wi + Wr - We = G \cdot (Tw - To) \qquad (2)$$

where
- Tw is the operating temperature of the resistor 1,
- To is the temperature of the front face of the heat-sink 21,
- G is the thermal conductance of the intermediate thermal resistive path 11,
- Wi is the power dissipated in the resistor 1 by the resistance (Joule) heating,
- Wr is the power input to the resistor 1 from the incident radiation 100, and
- We is the power radiated by the resistor 1 at temperature Tw.

If the operating temperature Tw is much lower than the ambient temperature, then We is much less than Wr and can be neglected. A negligible We can be assumed for resistors 1 formed of recently devised superconducting materials having a transition dR,dT at moderately high cryogenic temperatures. In this situation, equation (2) simplifies to a form similar to equation (1), although the mode of operation is quite different in that the design of the detector arrangement is such that Wi is a significant factor which varies inversely with Wr in the arrangement in accordance with the invention in order to auto-stabilize the operating temperature Tw.

Figure 3:
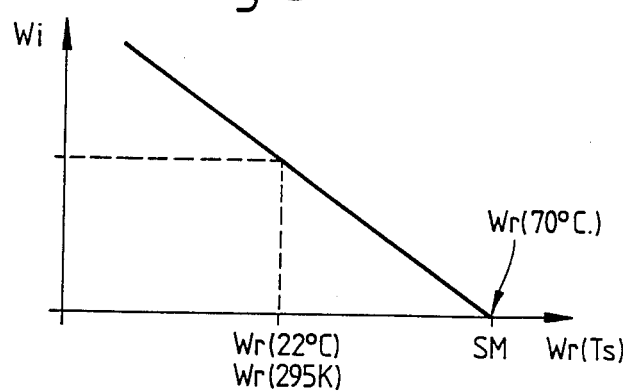
FIG. 3 is a plot illustrating the variation of resistance heating Wi with incident radiation power Wr (and scene temperature Ts) for one example of a detector arrangement in accordance with the invention.

FIG. 3 illustrates how the resistance heating Wi varies with incident radiation power Wr in one particular example. As Wr increases, Wi decreases until Wi is reduced to zero at point SM. This point SM determines the maximum power of incident radiation which can be detected in this manner and corresponds to a maximum scene temperature Ts which can be detected. In designing an arrangement for detecting infrared radiation 100 from an ambient temperature scene the values of bias voltage Vb and resistance Rw of the resistor 1 and its thermal coupling paths to the heat-sink 21,22 and to the radiation 100 may be chosen such that the maximum resistance heating is equal to twice the radiation power from a (black body) scene at 295 K (about 22° C.). This corresponds to a maximum detectable scene temperature at SM at about 70° C. (degrees Celsius). Higher scene temperatures may be detected by designing the detector and circuit means to include higher resistance heating Wi in the resistor 1, but with a higher resistance heating a smaller percentage variation in Wi is obtained for a given change in scene temperature Ts, i.e. a lower signal-to-noise ratio is obtained.

When $Wi=0$ (and $We=0$) at the point SM, then the maximum $Wr=G\cdot(Tw-To)$. Thus, in the example where the maximum $Wr=2\cdot W(295\ K)$, then:

$$G\cdot(Tw-To)=2\cdot W(295\ K) \qquad (3)$$

The thermal properties of the heat-sink 21,22 and its coupling 11 to the resistor 1 can be determined on the basis of equation (3), in terms of the heat-sink temperature To and the thermal conductance G which is determined by the thickness and area of the thermal resistive layer 11 and its thermal conductivity.

Furthermore, the following may be derived from equation (2):

$$V^2/Rw = Wi = G(Tw-To)-Wr \qquad (4)$$

where

V is a constant bias voltage applied across the resistor 1, and

Rw is the electrical resistance of the resistor 1 at its operating temperature.

In order to provide an approximate numerical illustration, a particular example will now be described using the high positive temperature coefficient of a superconducting material with its Tc transition at around 91 K. At this transition the resistivity of the material will be taken in this example to change from zero to about 200 micro-ohm.cm. over a temperature range of about two degrees from 91 K to 93 K so assuming a positive temperature coefficient of 100 micro-ohm·cm·K$^{-1}$. It will also be assumed that this material is in the form of a body 1 providing each resistor with a length of 200 μm (micrometres) between its electrodes 2 and 3 and an area of 100 μm × 100 μm. Therefore the resistance Rw of the resistor 1 is given by the expression:

$$Rw = \rho \times 2 \times 10^{-2}/10^{-4}\ \text{ohms}$$
$$= 2.\rho \times 10^{-2}\ \text{ohms}$$

where ρ is the resistivity of the material at the temperature Tw of the resistor 1 and has a magnitude of $(Tw-Tc)\cdot 10^{-4}$, i.e. $(Tw-91)\cdot 10^{-4}$ for Tc=91 K.

The device is operated by first applying the bias voltage V across the resistor 1 and then activating the heat-sink 21,22 to cool the resistor 1 to its operating position in the transition. Assuming that a constant bias voltage V of 100 μV (microvolts) is applied across the electrodes 2 and 3, and that the front face of the heat-sink 21,22 is cooled to a temperature To of 77.5 K, and that the power Wr of incident radiation 100 (mostly infrared in the 8 to 14 μm wavelength band) from a scene at 295 K is $10^{-2}$ W·cm$^{-2}$, and that the thermal conductance G from the heat-sink 21,22 to the resistor 1 is $2\times 10^{-7}$ W·K$^{-1}$, then:

$$V^2/Rw = 5\times 10^{-7}\ (Tw-91)^{-1}$$

and $$G(Tw-To)-Wr = 2\times 10^{-7}\ (Tw-77.5)-10^{-6}$$

so that from equation (4):

$$5\times 10^{-7}\ (Tw-91)^{-1} = 2\times 10^{-7}\ (Tw-77.5)-10^{-6}.$$

Solving this equation given an equilibrium temperature $$Tw = 91.285\ K.$$

At this temperature of $Tw=91.285K$, $$\rho = 28.46\ \text{micro-ohm·cm.}$$

and $$Rw = 5.692\ \text{milli-ohms.}$$

Thus, when detecting the incident radiation flux of $10^{-2}$ W·cm$^{-2}$ from a scene at 295 K, the resistor 1 adjusts itself to a point on the transition dR,dT at which its resistivity is 28.46 micro-ohm.cm. and its resistance Rw is 5.692 milli-ohms. The resistance heating Wi is $1.757\times 10^{-6}$ W (i.e. about 1.8 times Wr from a scene at 295 K). With a bias voltage V of 100 μV across the resistor 1, the current I passing through the resistor in this state is given by:

$$I = Wi/V = 17.57\ mA$$

When the scene temperature increases, for example by 1° C., so as to increase the incident radiant power Wr which is input to the resistor 1 by $10^{-8}$W, then Rw increases to 5.723 milli-ohms (corresponding to a resistivity increase to 28.62 micro-ohm.cm) in order to reduce the resistance heating Wi by the corresponding amount ($10^{-8}$W). The bias voltage cross the resistor 1is constant (100 μV) so that this reduction in resistance heating corresponds to a reduction in the current I of 97 μA (microAmps), i.e. about 0.5% to 17.47 mA (milli-Amps). This variation in the current is measured (in terms of variation in the output current I' from the circuit of FIG. 1) to provide a signal indicative of the power Wr of the incident radiation 100.

The change in resistivity from 28.46 to 28.62 micro-ohm.cm. due to the change in the scene temperature corresponds to a change in the operating temperature Tw of the resistor 1 to only $1.57\times 10^{-3}$K, for the high positive temperature coefficient of 100 micro-ohm·cm·K$^{-1}$. Therefore, the reduction in resistance heating Wi to compensate for the increase in radiation power Wr has effectively stabilised the temperature of the resistor 1 at Tw. This provides a high responsivity, a very fast response, and a significant reduction in thermal cross-talk between resistors 1 of an array.

If the detector arrangement had not been operated in accordance with the invention, i.e. if it had been operated by not utilizing any reduction in resistance heating, then, from equation (1), the change in temperature Tb of the bolometer element for a change of $10^{-8}$W in Wr would be about $50\times 10^{-3}$K, which is more than 30 times worse. Conversely, the change in Wr required to produce a $1.57\times 10^{-3}$K change in Tw in the absence of any change in the resistance heating would be about $3\times 10^{-1}$W; this is about 30 times smaller than the change in resistance heating Wi ($10^{-8}$W) produced by this $1.57 \times 10^{-3}$K change in Tw in the detector arrangement in accordance with the invention.

FIG. 1 illustrates schematically one particular example of a general form of radiation detector arrangement in accordance with the invention. It should be understood that particular forms and modifications of the elements shown would be adopted in a specific embodiment of the invention. The resistor detector element 1 is shown mounted in an enclosure 50 illustrated only in generalised form in FIG. 1. The enclosure 50 has a window 51 for transmitting the radiation 100 to be detected. In the case of infrared radiation 100, such a window 51 may be of germanium or other suitably transmissive material. The transmission characteristics of the window 51 may be such as to filter out undesired radiation. Furthermore the transmissive member 51 may, if desired, be shaped to form a lens or other optical element for concentrating the radiation 100 onto the detector element resistor 1.

In the form illustrated in FIG. 1, the detector element resistor 1 is mounted on a compound base 10,11,21,22 comprising a heat-sink 21,22 for establishing a temperature to below the ambient temperature. In this example, the heat-sink 21,22 comprises a cryogenic cooler 22 thermally coupled to a heating block 21 so as to provide a temperature To intermediate the ambient temperature and the cryogenic cooler temperature. The block 21 may comprise, for example, a heating element 24 and a thermocouple 25, the current through element 24 being controlled by a control unit 23 to maintain the desired temperature To as sensed by the thermocouple 25. In this case, the cooler 22 may be of the Joule-Thomson type in which the cooling is effected by expansion of a high pressure gas into a chamber from a nozzle, the gas being supplied via inlet 27 and vented via outlet 28. Such a Joule-Thomson cooler may be of the helical finned-tubular type mounted inside the inner chamber of a dewar, for example as described in United States patent U.S. Pat. No. 942,010, or it may be, for example, of the channelled glass laminate type, for example as described in published European patent application EP-A-0 136 687, in which case it may form both the base for the enclosure 50 and the main structural unit for the detector.

However, instead of the multiple unit 21,22, it is also possible to use coolers, for example thermoelectric coolers using the Peltier effect, which can be controlled electrically by a control unit 23 to determine a temperature To sensed by a thermocouple 25 or other temperature sensor. In this case, the separate unit 21 with heater 24 is not included. However, such electrically-controlled coolers generally cannot provide as low a temperature To as can be provided using, for example, Joule-Thomson coolers. It should be understood that the particular form of the heat-sink 21,22 is adapted to the particular requirements for the resistance material 1 which is used in a particular detector arrangement. In some case a resistance material 1 may be used at around ambient temperature or even at an elevated temperature.

In order to equalise the temperature at the whole front surface of the thermally-resistive layer 11 as transmitted from the heat-sink 21,22, a substrate 10 of good thermally conductive material is included between the thermally-resistive layer 11 and the resistor body 1. Such a substrate 10 may be of, for example, sapphire or beryllia. Even in the case of an array of resistors 1 (see FIG. 4), a common thermally conductive substrate 10 can still be included without introducing significant thermal cross-talk, because of the stabilization of the temperature Tw of the resistors 1 due to the change in their resistance heating with change in absorbed radiation power Wr.

As hereinbefore mentioned, the resistor 1 may comprise as its resistance material a material having its high positive temperature coefficient at a transition from a superconducting state, and composed of an oxygen-deficient mixed-oxide of elements a, b and c where c is copper, b is at least one element selected from the group of barium, strontium and calcium and a is at least one element selected from the group of yttrium and the lanthanides (i.e. the lanthanide so-called "rare earth" series). Ceramic materials of this composition and having a distorted oxygen-deficient perovskite structure have been made with transitions at moderately high cryogenic temperature, for example in the range of 90 to 100 K. A particular example is $Ba_2 Y Cu_3 (O_{(9-d)})$, where d is about 2.1, for which the transition from superconducting occurs at about 91 K. However other materials may be used for the resistor 1, for example a barium titanate ceramic which is doped so as to be semiconducting and which has a high positive temperature coefficient at a transition at its Curie temperature. The temperature of the transition for barium titanate is about 120° C., but by substituting (partially or wholly) other elements for the barium and/or titanium the transition temperature range can be shifted to higher to lower temperatures. Thus, by incorporating zirconium instead of titanium on Ti sites, the transition can be shifted to lower temperatures. Thus, it will be apparent that resistors 1 used as detector elements in accordance with the present invention can be designed to operate below or around or above ambient temperature. An advantage in choosing a resistor material 1 with its high positive temperature coefficient at an operating temperature Tw below ambient temperature is that Johnson noise in the resistor is held to a low level.

FIG. 1 illustrates a simple circuit means Vb,D,T, for measuring the current through the resistor 1 with constant bias voltage across the resistor 1. In this example an output signal in the form of current I' provides an indication of the power Wr of the incident radiation 100. This current I' is provided via the transistor T as controlled by the differential amplifier D which takes inputs from the resistor 1 and the constant voltage source Vb. The voltage source Vb has a low electrical noise level, since noise on the bias voltage V would produce corresponding noise fluctuations on the signal current. The actual bias voltage V across the resistor 1 differs from Vb by the offset voltage of the differential amplifier D. FIG. 1 illustrates one example of a circuit which can be used with a single detector element 1. Other circuits may be used with a single element 1, and other more complex circuits may be used with arrays of detector elements 1.

Figure 4:
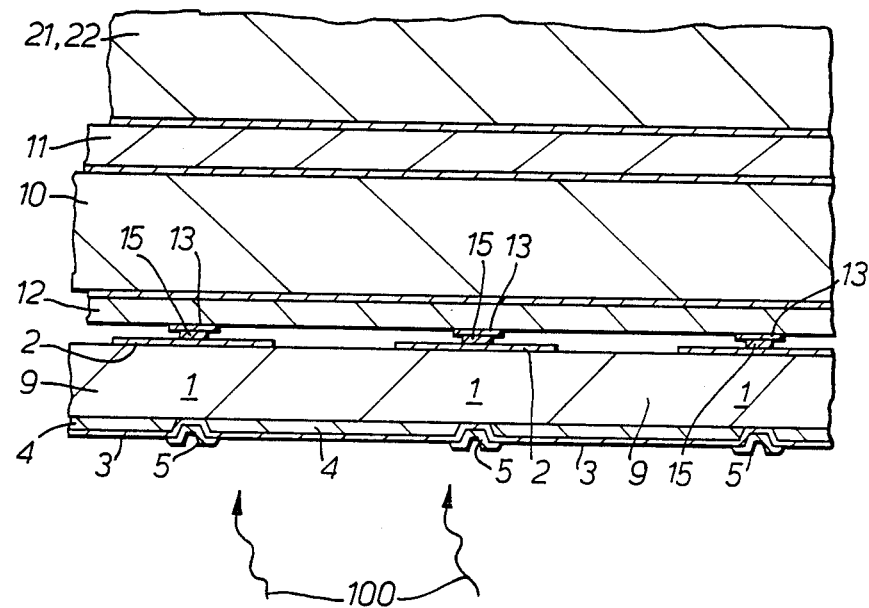
FIG. 4 is a sectional view of part of a detector arrangement in accordance with the invention, and comprising an array of resistor elements having a common body of resistance material.

FIG. 4 illustrates an array of detector elements 1 having a common body 9 of the resistance material and operated with varying resistance heating Wi in the same manner in accordance with the invention. Corresponding or similar parts in this embodiment are given the same reference signs as in the previous embodiment. In this case a part of the circuit for processing the current signals from the resistors 1 of the array is formed by semiconductor circuit elements in a semiconductor circuit substrate 12. The substrate 12 may comprise, for example, a multiplexer circuit. The front surface of the circuit substrate 12 has electrical terminal pads 13 to which the individual back electrodes 2 of the resistors 1 are electrically connected, for example via solder material 15.

The individual resistors 1 of the array are defined in the common body 9 by the geometry of the contact areas formed at the front and back major faces by the respective front and back electrodes 3 and 2. There are discrete back electrodes 2 but a common front electrode 3 for the array. This front electrode 3 contacts the body 9 at openings in an insulating layer 4 at the front surface of the body 9. In the particular form shown, by way of example, in FIG. 4, the electrode 3 which faces the radiation 100 has a smaller contact area with the body 9 than does the electrode 2. An advantage of this smaller front contact area is that it concentrates the current through the resistors 1 so tending to localise the resistance heating in the common body 9. Furthermore the infrared 100 or other radiation 100 being detected may be absorbed in a localized coating 5 over this localized contact area.

Because the variation in resistance heating leads to only very small excursions in the operating temperature Tw in response to variations in the incident radiation power Wr, arrays of resistors 1 can be made with a common body 9 as in FIG. 4 without thermal cross-talk problems. Furthermore, the common body 9 can be in intimate thermal contact with the semiconductor circuit substrate 12 without introducing thermal loading problems. This may be compared with the situation for the ferroelectric array disclosed in published United Kingdom patent application GB-A-2 030 023 where the detector array body needs to be separated from the semiconductor circuit by an anisotropic heat-sink with electrical conductors restricted to elongated narrow rods so as to restrict heat flow between the detector elements and the semiconductor circuit. Furthermore, since the frequency response of the resistor detector elements 1 in accordance with the present invention extends even down to d.c., the array of FIG. 4 can be used in a staring mode, without opto-mechanical modulation of the radiation 100 by a chopper or scanner, if such a staring mode of operation is desired.

Figure 5:
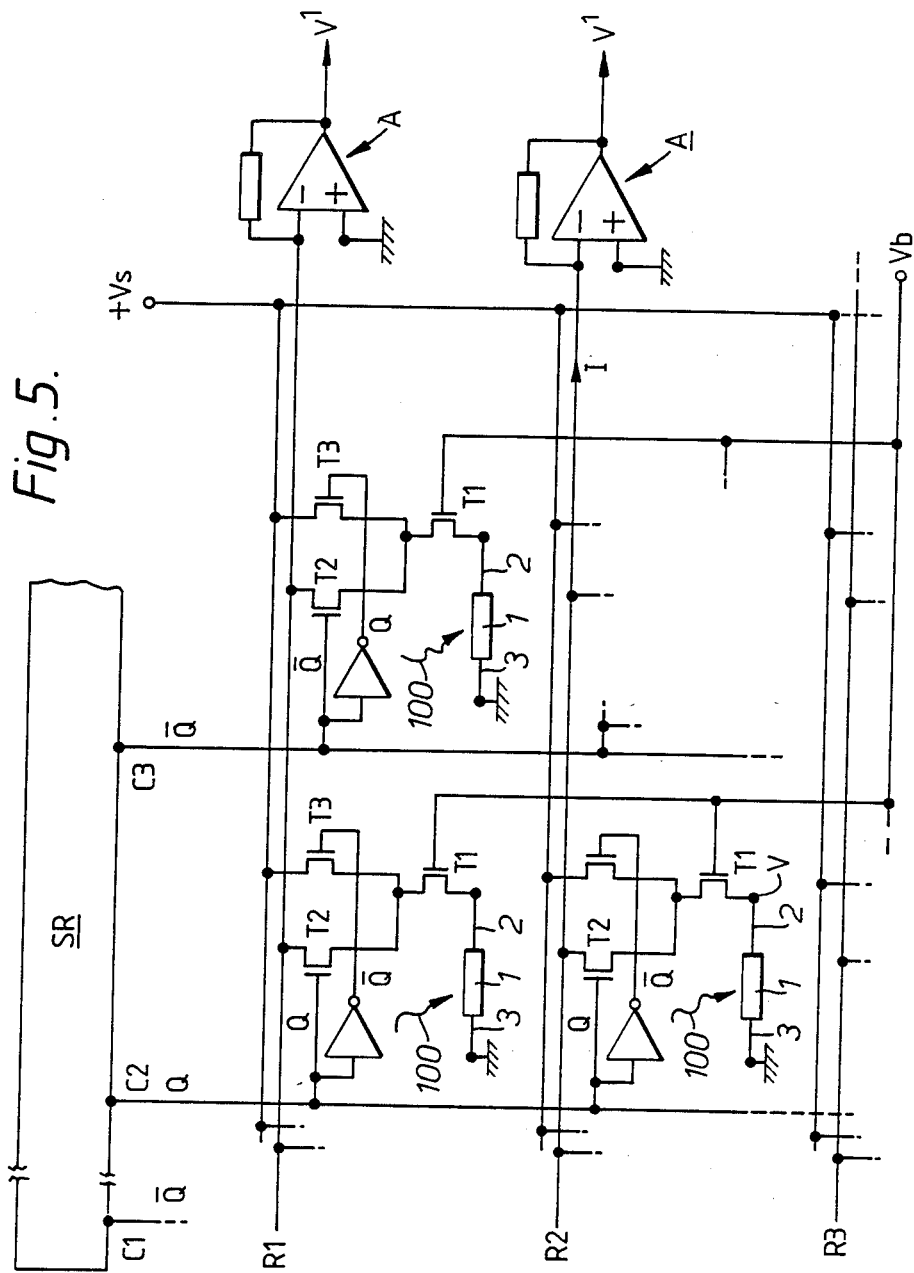
FIG. 5 is a circuit diagram of one example of a signal processing circuit for an array of resistor elements in an arrangement in accordance with the present invention.

FIG. 5 illustrates one example of a circuit for reading out signals from an array of the resistor detector elements 1 arranged in columns and rows, respectively C1,C2 etc and R1,R2 etc. The circuit comprises a voltage source Vb for applying a constant bias voltage V across each resistor 1, via an individual MOS transistor T1 for each resistor 1. The actual bias voltage V across the resistor 1 is the sum of Vb and the gate-to-source voltage of the transistor T1. Switching means T2 and T3 is associated with each of the resistors 1 in the array to switch the current passing through the resistor 1 to either a current-measuring means A or to a current sink +Vs. As illustrated, the switching means may be, for example, MOS transistors T2 and T3 whose gates are controlled by mutually inverted signals Q and $\overline{Q}$ derived for a column-address shift register SR. As illustrated, the current-measuring means may be, for example, a transconductance amplifier A common to each row of the array. The output signal from such an amplifier A is a voltage V' proportional to the current I through the resistor 1. The outputs from the row amplifiers A may be connected to a multiplexer to form a serial output signal from the whole array. Most of this circuit may be integrated in a semiconductor substrate 12 supporting the resistor array, or at least the switching means T2 and T3 and column address decoder SR may be so integrated.

Instead of transconductance amplifier A, the current I from the resistor 1 may be fed to a sense amplifier for each row, or for example the read-out may comprise a charge-coupled device with the resistor current I being gated for a part of each frame period into individual charge-storage sites of the CCD. Such a CCD may form part of the substrate 12. Furthermore, the resistor current I may be measured by integration on a capacitor the voltage on which is muliplexed to an output, after which the capacitor is reset. Thus, FIG. 5 only illustrates one particular example.

From reading the present disclosure, other modifications will be apparent to persons killed in the art. Such modifications may involve other features which are already known in the design, manufacture and use of infrared and other radiation detector systems and positive temperature coefficient devices and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such feature and/or combinations of such features during the prosecution of the present application or of any further application derived therefrom.

I claim:

1. A radiation detector arrangement comprising at least one detector element in the form of a temperature-sensitive resistor whose electrical resistance changes in response to radiation incident on the detector element, the resistor having a high positive temperature coefficient of electrical resistance at a transition in its electrical conductance, circuit means for applying a voltage across the resistor during operation of the detector arrangement, and temperature-regulation means for regulating the temperature of the resistor so as to operate the resistor in said transition, characterised in that the temperature-regulation means comprises the resistor and the circuit means which passes sufficient current through the resistor by resistance heating to a position in said transition at which a further increase in its temperature in response to incident radiation reduces the resistance heating by reducing the current, thereby stabilizing the temperature of the resistor at said position, the positive temperature coefficient at said position being sufficiently high that the change in the resistance heating produced by a change in the temperature of the resistor at said position is larger than a change in power of the incident radiation required to produce that same change in temperature of the resistor in the absence of any change in resistance heating.

2. An arrangement as claimed in claim 1, further characterised in that the circuit means maintains a substantially constant bias voltage across the resistor and measures the varying current through the resistor to provide a signal indicative of the power of the incident radiation.

3. An arrangement as claimed in claim 1 further characterised by comprising an array of said detector elements having a common body of the resistance material, the reduction in resistance heating in each resistor in response to the incident radiation serving to reduce thermal cross-talk between that respective resistor and neighbouring resistors in the array.

4. An arrangement as claimed in claim 3, further characterised in that each resistor has a first electrode at a first major face of the body which faces the incident radiation, and a second electrode at an opposite major face of the body, the first electrode having a smaller contact area with the body than does the second electrode.

5. The arrangement as claimed in claim 3 further characterised in that the circuit means comprises switching means associated with each of said resistors in the array to switch the current passing through the resistor to either a current-measuring means or to a current sink.

6. An arrangement as claimed in claim 1, further characterised in that the resistor comprises a body which is of resistance material having said positive temperature coefficient and which is mounted on a substrate comprising semiconductor circuit elements forming at least part of said circuit means.

7. An arrangement as claimed in claim 1, further characterised in that said transition occurs below ambient temperature, the resistor being thermally coupled via a thermally resistive path to a temperature-controlled heat sink for cooling the resistor to a temperature which is near the bottom of the transition in the absence of any resistance heating of the resistor.

8. An arrangement as claimed in claim 7, further characterised in that the high positive coefficient occurs at a transition from a superconducting state.

9. An arrangement as claimed in claim 8, further characterised in that the resistor comprises as a resistance material an oxygen-deficient mixed-oxide of elements a, b and c where c is copper, b is at least one element selected from the group of barium, strontium and calcium, and a is at least one element selected from the group of yytrium and the lanthanides.

10. An arrangement as claimed in claim 9, further characterised in that the resistor comprises a semiconducting, doped barium titanate ceramic as a resistance material having the high positive temperature coefficient.

11. A method of detecting incident radiation using at least one detector element in the form of a temperature-sensitive resistor whose electrical resistance changes in response to radiation incident on the detector element, the resistor having a high positive temperature coefficient of electrical resistance at a transition in its electrical conductance, wherein a voltage is applied across the resistor during operation of the detector arrangement, the method being characterised in that sufficient current is passed through the resistor by the application of the voltage as to raise the temperature of the resistor by resistance heating to a position in said transition at which a further increase in its temperature in response to incident radiation reduces the resistance heating by reducing the current, thereby stabilizing the temperature of the resistor at said position, and in that the varying current through the resistor is measured to provide a signal indicative of the power of the incident radiation, the positive temperature coefficient of the resistor at said position being sufficiently high that the change in the resistance heating produced by a change in the temperature of the resistor at said position is larger than a change in power of the incident radiation required to produce that same change in temperature of the resistor in the absence of any change in resistance heating.

* * * * *